United States Patent [19]
Kachmarik

[11] Patent Number: 5,719,471
[45] Date of Patent: Feb. 17, 1998

[54] THREE-WAY DIMMING CIRCUIT FOR COMPACT FLUORESCENT LAMP

[75] Inventor: David J. Kachmarik, Strongsville, Ohio

[73] Assignee: General Electric Company, Schenectady, N.Y.

[21] Appl. No.: 762,230

[22] Filed: Dec. 9, 1996

[51] Int. Cl.$^6$ .................................................. H05B 37/02
[52] U.S. Cl. ..................... 315/209 R; 315/200 R; 315/362; 315/307; 315/DIG. 4
[58] Field of Search .................... 315/307, 308, 315/224, 209 R, DIG. 4, DIG. 5, 291, 200 R, 208, 362

[56] References Cited

U.S. PATENT DOCUMENTS 4,383,204  5/1983  Roberts .
5,309,062  5/1994  Perkins et al. ..................... 315/53

OTHER PUBLICATIONS (Product Note), "Ballast IC Applications Information (IR2151): Pre–Heating a Lamp Filament Without a PTC Resistor," International Rectifier Corporation, Oct. 1994, three pages.
(Product Note), "L6569: High Voltage Half Bridge Driver with Oscillator," SGS–Thompson Microelectronics, Mar. 1996, six pages.
(Product Note), "Provisional Data Sheet on IR 2155 Self–Oscillating Power MOSFET/IGBT Gate Driver," International Rectifier, Aug., 1993, five pages, the IR2155 driver being functional similar to the IR2151 driver mentioned at p. 3 of the present specification.

Primary Examiner—Robert Pascal
Assistant Examiner—David Vu
Attorney, Agent, or Firm—George E. Hawranko

[57] ABSTRACT

A ballast for a gas discharge lamp comprises a resonant load circuit including a gas discharge lamp, and a resonant inductance and a resonant capacitance whose values determine the operating frequency of the remnant load circuit. A d.c.-to-a.c. converter circuit is coupled to the remnant load circuit to provide a.c. current to the remnant load circuit. The converter comprises at least one switch. A high voltage IC drives the at least one switch at a frequency determined at least in part by impedance between a timing input and a ground. A circuit for supplying a d.c. voltage to the d.c.-to-a.c. converter includes (i) a supply path for d.c. current; (ii) first and second return paths for d.c. current; and (iii) an arrangement to selectively make the first return path operable alone, the second path operable alone, and the first and second paths operable together. First and second impedances are coupled between the timing input and the first and second return paths, respectively. A second, one-way current valve isolates the second impedance from the ground when the second current path is rendered inoperable. A first, one-way current valve isolates the first impedance from the ground when the first current path is rendered inoperable. A second, one-way current valve isolates the second impedance from the ground when the second current path is rendered inoperable. When the lamp comprises resistively heated cathodes, a cathode current-controlling, frequency-dependent impedance is preferably connected between the resistively heated cathodes.

14 Claims, 3 Drawing Sheets

THREE-WAY DIMMING CIRCUIT FOR COMPACT FLUORESCENT LAMP

FIELD OF THE INVENTION

The present invention relates to ballast, or power supply circuits, for fluorescent lamps. More particularly, the invention relates to a ballast that provides for three-way dimming of a fluorescent lamp.

BACKGROUND OF THE INVENTION

Lamp fixtures for incandescent lamps, as opposed to fluorescent lamps, have long accommodated three different lamp power levels. This allows a lamp to be dimmed, for example, from a bright light condition, to a medium light condition, or to a low light condition. Fluorescent lamps, however, have traditionally been unable to function in such a three-way dimming lamp fixture due to limitations of fluorescent ballasts. Therefore, it would be desirable to provide a lamp ballast that provides for three-way dimming of a fluorescent lamp.

OBJECTS AND SUMMARY OF THE INVENTION

Accordingly, an object of the invention is to provide a lamp ballast that provides for three-way dimming of a fluorescent lamp.

A further object of the invention is to provide a lamp ballast of the foregoing type in which the fluorescent lamp can be accommodated in existing Edison (or screw-type) lamp fixtures.

The foregoing objects are realized in preferred form by a ballast comprising a resonant load circuit including a gas discharge lamp, and a resonant inductance and a resonant capacitance whose values determine the operating frequency of the resonant load circuit. A d.c.-to-a.c. converter circuit is coupled to the resonant load circuit to provide a.c. current to the resonant load circuit. The converter comprises at least one switch. A high voltage IC drives the at least one switch at a frequency determined at least in part by impedance between a timing input and a ground. A circuit for supplying a d.c. voltage to the d.c.-to-a.c. converter includes (i) a supply path for d.c. current; (ii) first and second return paths for d.c. current; and (iii) an arrangement to selectively make the first return path operable alone, the second path operable alone, and the first and second paths operable together. First and second impedances are coupled between the timing input and the first and second return paths, respectively. A second, one-way current valve isolates the second impedance from the ground when the second current path is rendered inoperable. A first, one-way current valve isolates the first impedance from the ground when the first current path is rendered inoperable. A second, one-way current valve isolates the second impedance from the ground when the second current path is rendered inoperable. When the lamp comprises resistively heated cathodes, a cathode current-controlling frequency-dependent impedance is preferably connected between the resistively heated cathodes.

BRIEF DESCRIPTION OF THE DRAWINGS

The foregoing objects and further advantages and features of the invention will become apparent from the following description when taken in conjunction with the drawing, in which like reference numerals refer to like parts, and in which.

DETAILED DESCRIPTION OF THE PREFERRED EMBODIMENTS

Figure 1:
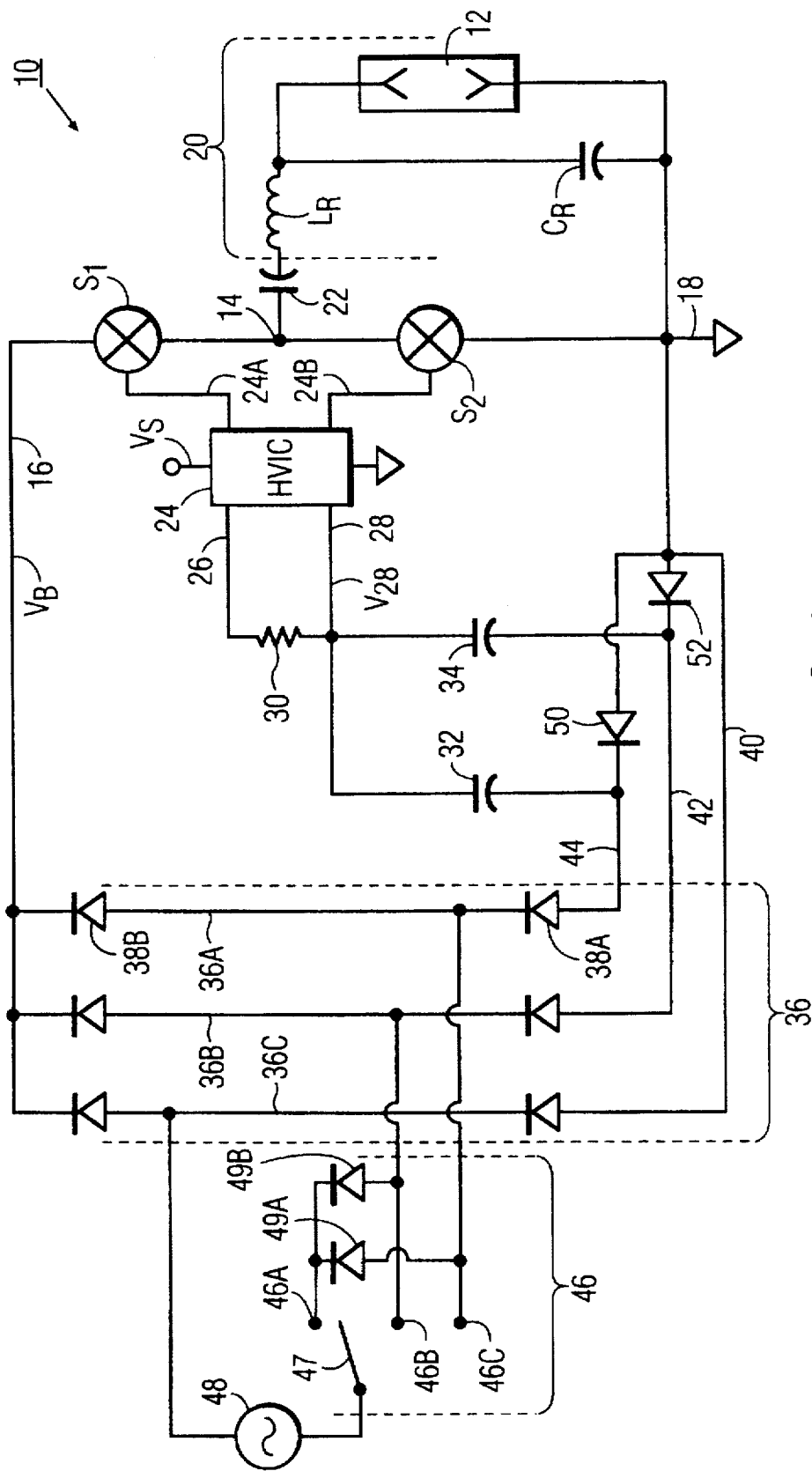
FIG. 1 is a schematic diagram, partly in block form, of a ballast for a fluorescent lamp which provides a 3-way dimming function.

FIG. 1 shows a ballast circuit for a fluorescent lamp 12. Lamp 12 may be of the compact variety, i.e., having an Edison-type screw base (not shown) for installation into a standard lamp fixture (not shown) for an incandescent lamp. A pair of switches $S_1$ and $S_2$, such as MOSFETs are serially connected together at a common node, with the serially connected switches being connected between a conductor 16 on which a d.c. bus voltage $V_B$ is present, and a reference node, or ground, 18. Switches $S_1$ and $S_2$ alternately connect common node 14 so as to be at bus voltage $V_B$ and at ground 18 potential. As a result, a.c. current is induced in a resonant load circuit 20, which includes a resonant inductor $L_R$, a resonant capacitor $C_R$, and lamp 12. A d.c. blocking capacitor 22 prevents d.c. current from flowing in resonant load circuit 20.

A high voltage integrated circuit (HVIC) 24 controls switches $S_1$ and $S_2$ via signals provided on respective control lines 24A and 24B. HVIC 24 is suitably a conventional IR2151 or IR 2155 integrated circuit, designated a "Self-Oscillating Half-Bridge Driver," sold by International Rectifier Company of El Segundo, Calif. The mentioned integrated circuits alternately turn on switches $S_1$ and $S_2$, with respective dead times provided between either switch being on so as to reduce switching losses.

Figure 2:
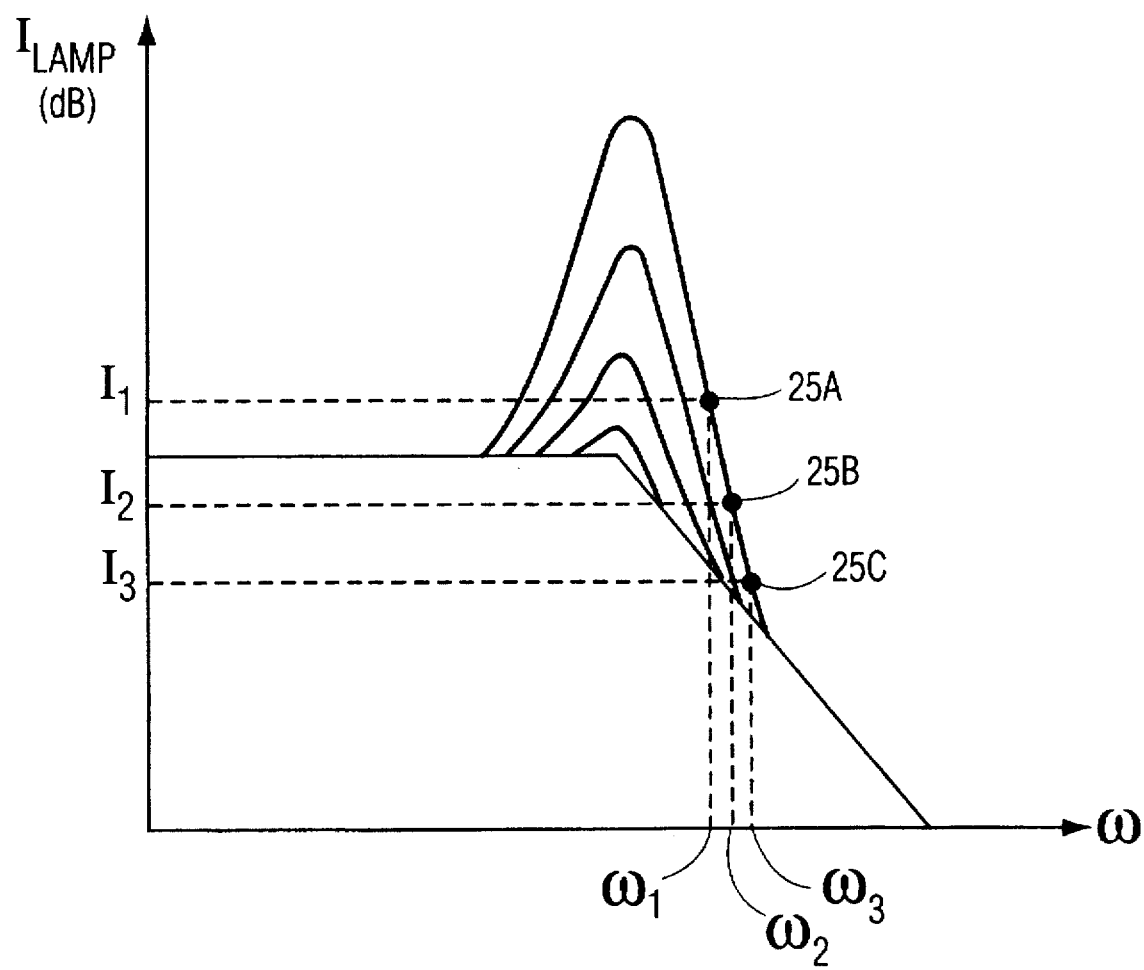
FIG. 2 is a simplified lamp current-versus-angular frequency graph illustrating three points for operating a fluorescent lamp.

This switching frequency of HVIC 24 determines the lumen level of lamp 12, as shown by FIG. 2. FIG. 2 is a simplified lamp current-versus-angular frequency graph illustrating three points 25A, 25B, and 25C for operating a fluorescent lamp to achieve three different lumen levels. Thus, at angular frequency $\omega_1$ (point 25A), a lamp current of $I_1$ occurs, corresponding to a lumen level of, for example, 150 watts incandescent equivalent. At a higher angular frequency $\omega_2$ (point 25B), a lower lamp current $I_2$ occurs, corresponding to a lower lamp lumen level of, for example, 100 watts incandescent equivalent. Similarly, at a still higher angular frequency $\omega_3$ (point 25C), the lamp current is further reduced to current $I_3$, corresponding to a further reduced lumen level of, for example, 60 watts incandescent equivalent.

The switching frequency of HVIC 24 (FIG. 1) is determined at least in part by impedances connected to its timing inputs 26 and 28. It may also be determined, for instance, by a signal proportional to lamp current that is fed back to timing input 28. A resistor 30 is connected between inputs 26 and 28 as shown. In a departure from the prior art, capacitors 32 and 34 are selectively coupled to ground 18 in a manner which results in three different capacitive impedance levels, causing three different levels of lamp power. Switching operation of HVIC 24 is now explained.

Figure 3:
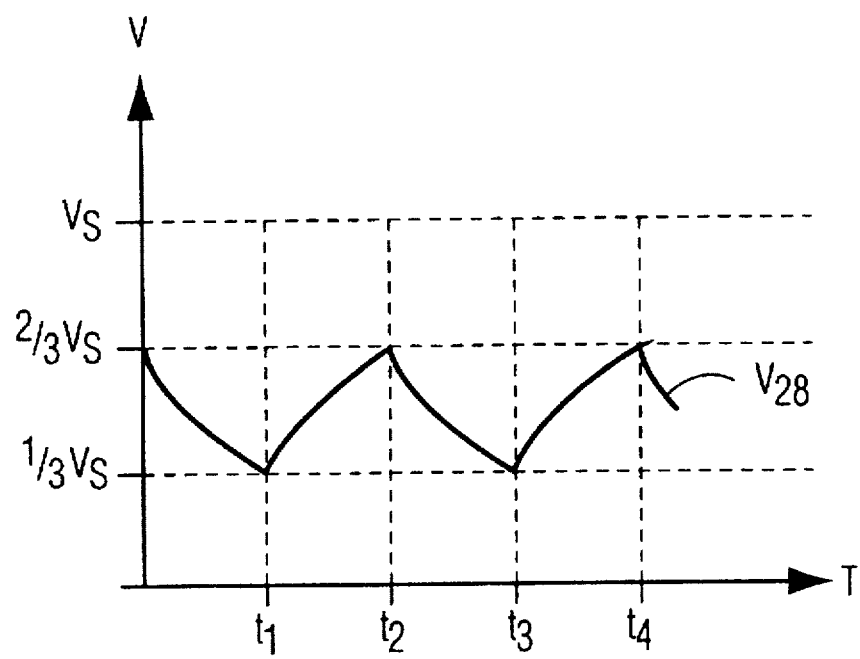
FIG. 3 is a voltage-versus-time graph of a typical timing signal applied to a timing input of a high voltage integrated circuit of FIG. 1, for maintaining a desirably high temperature for the cathodes of the lamp.

Thus, referring to FIG. 3, a timing signal $V_{28}$ on input 28 is shown transitioning between a pair of voltage thresholds, which, as shown, may be ⅓ of a supply voltage $V_S$, which supplies HVIC 24 of FIG. 1, and ⅔ of supply voltage $V_S$. Typically, when timing signal $V_{28}$ increases from the lower threshold and reaches the upper threshold, the upper end of timing resistor 30 becomes connected to ground 18 so that a capacitance (described below) connected between ground 18 and input 28 discharges to ground through the timing resistor. Similarly, when timing signal $V_{28}$ then decays to the lower threshold, the upper end of timing resistor 30 is then connected to supply voltage $V_S$, charging the mentioned capacitance and causing timing signal $V_{28}$ to increase towards the upper threshold. At or near the transition points, e.g., at times $t_1$, $t_2$, $t_3$, and $t_4$ in FIG. 3, alternate switching of switches $S_1$ and $S_2$ is caused. Now, varying the capacitance between timing input 28 and ground 18 will result in differently spaced transition points $t_1$, $t_2$, $t_3$, etc., because the R*C time constant of voltage $V_{28}$ will accordingly change. How such capacitance is varied is now considered.

Circuitry 36 in FIG. 1 comprises a half-bridge rectifier, formed of three sets of diode pairs, e.g., diode pair 38A and 38B in line 36A, and other sets (unnumbered) in lines 36B and 36C. Conductor 16, on which bus voltage $V_B$ exists, constitutes a current supply path for serially connected switches $S_1$ and $S_2$, which form a d.c.-to-a.c. converter. Current paths 40, 42, and 44 constitute current return paths from the switches $S_1$ and $S_2$ to circuitry 36.

A switch arrangement 46 interconnects one line from an a.c. power source 48 to lines 36A and 36B in a selective manner; the other (upper) line from the power source connects directly to line 36C. Switch 46 is designed so that a single switch arm 47 can selectively contact point 46A, 46B, or 46C. When arm 47 contacts point 46A, current return paths to source 48 are provided from line 36A via diode 49A and arm 47, and from line 36B through diode 49B and arm 47. When arm 47 contacts point 46B, a single return path to source 48 is provided from line 36B and arm 47. When arm 47 contacts point 46C, a single return path to source 48 is provided from line 36B and arm 47.

As can be appreciated from the foregoing, the use of switch 46 will cause current return paths to a.c. source 48, from the d.c.-to-a.c. converter formed by serially connected switches $S_1$ and $S_2$, to be operable in any of three combinations: both return paths through lines 36A and 36B being operable, only the return path through line 36A being operable, and only the return path through line 36B being operable. The current return path through line 36C is always operable.

The selective operability of the return paths respectively including lines 36A and 36B, i.e., return paths 44 and 42, respectively, is relied on to selectively couple either one or both capacitors 32 and 34 to ground 18. This may be accomplished through the use of a one-way current valve 50 connected between ground 18 and return path 44, to which capacitor 32 is connected; and the use of a one-way current valve 52 connected between ground 18 and return path 42, to which capacitor 34 is connected. Both one-way current valves are poled to direct current from ground 18 to lines 36A and 36B, respectively. The current valves 50 and 52 may conveniently comprise p-n diodes.

In operation, when the current return path 44 is operable, the voltage on the bottom of capacitor 32 is, for example, one p-n diode voltage drop (e.g. 0.7 volts) above ground 18. Similarly, when the current return path 42 is operable, the voltage on the bottom of capacitor 34 is, for example, one p-n diode voltage drop (e.g. 0.7 volts) above ground 18. Accordingly, the effective capacitance from timing input 28 to ground 18, excluding the minor effect of the voltage drops across one-way current valves 42 and 44, is either the capacitance of capacitor 32 alone, the capacitance of capacitor 34 alone, or the parallel combination of both capacitances, which is additive. As explained above with regard to the timing graph of FIG. 3, the different capacitance values between timing input 28 and ground 18 will result in a differently sloped curve for voltage $V_{28}$, in turn resulting in different frequencies of switching of switches $S_1$ and $S_2$. The different frequencies of operation of the switches then results in different power levels for the lamp, as explained above in connection with the lamp current-versus-angular frequency graph of FIG. 2.

Existing Edison-base lamp fixtures of the three-way dimming type for incandescent lamps typically include a switch arrangement such as designated 46 in FIG. 1, to achieve three-way dimming. Beneficially, a fluorescent lamp powered by the disclosed ballast can be accommodated in such existing lamp fixtures when the lamp employs an Edison base.

Figure 4:
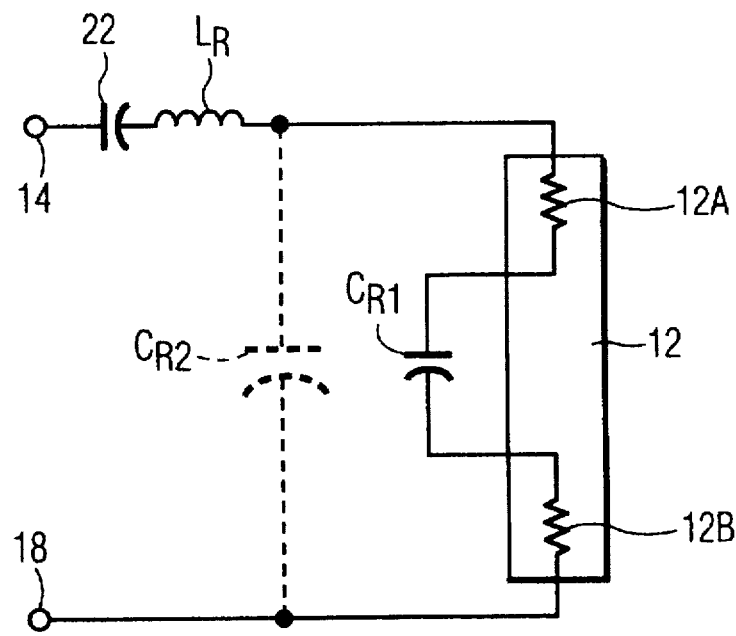
FIG. 4 is a schematic diagram of a preferred modification of the circuit of FIG. 1.

FIG. 4 shows a preferred modification of the circuit of FIG. 1, for maintaining a desirably high temperature for the cathodes of lamp 12. The circuit shown represents the circuit to the right of nodes 14 and 18 in FIG. 1. Resistively heated cathodes 12A and 12B of the lamp are illustrated in FIG. 4. As is known, providing current through such cathodes maintains the temperature of the cathodes for assuring long cathode life. In FIG. 4, at least part of the resonant capacitance of the circuit, e.g., the capacitance of resonant capacitor $C_{R1}$, is serially connected between cathodes 12A and 12B. As a result, with reference to FIG. 2, as the lamp current changes from $I_1$ at operating point 25A to $I_2$, for example, at operating point 25B, the angular frequency of lamp current increases from $\omega_1$ to $\omega_2$. Correspondingly, the capacitive impedance of resonant capacitor $C_{R1}$ decreases according to the known relation of $1/j\omega C$, where "j" is the square root of $-1$ and "C" is capacitance.

The decreasing current through the lamp in changing from operating point 25A to operating point 25B (FIG. 2), for instance, tends to decrease the current through cathodes 12A and 12B. By itself, this phenomena would tend to reduce the heating of the cathodes. Two factors related to capacitor $C_{R1}$ counteract this tendency. First, as lamp current decreases, lamp impedance increases, causing the resonant load circuit 20 to become unloaded, which increases the circulation current through capacitor $C_{R1}$. Second, as the system frequency increases, the impedance of capacitor $C_{R1}$ decreases as mentioned above. Both factors contribute to increased current flow through capacitor $C_{R1}$ and, hence, through cathodes 12A and 12B. Beneficially, then, the level of current in cathodes 12A and 12B can be maintained at a desirably high value to assure adequate $i^2r$ heating in the cathodes, where "i" represents current and "r" represents resistance.

According to the foregoing, preferred aspect of the invention, at least part of the resonant capacitance of the circuit is serially interposed between lamp cathodes 12A and 12B, and decreases in impedance value as opearating frequency increases.

As shown in FIG. 4, part of the resonant capacitance may be implemented by resonant capacitor $C_{R2}$ (shown in phantom), which is essentially in parallel with resonant capacitor $C_{R1}$. The value of capacitor $C_{R2}$ is chosen to: (1) assure proper preheating and steady state heating of cathodes 12A and 12B; (2) match the forcing function for the lamp (i.e., the voltage at node 14 in FIG. 1) to the lamp; and (3) assure proper open circuit voltage across the lamp to start the lamp.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A ballast for a gas discharge lamp, comprising:
   (a) a resonant load circuit including a gas discharge lamp, and a resonant inductance and a resonant capacitance whose values determine the operating frequency of said resonant load circuit;
   (b) a d.c.-to-a.c. converter circuit coupled to said resonant load circuit to provide a.c. current to said resonant load circuit; said converter comprising at least one switch;
   (c) a high voltage IC for driving said at least one switch at a frequency determined at least in part by impedance between a timing input and a ground;
   (d) a circuit for supplying a d.c. voltage to said d.c.-to-a.c. converter, including:
      (i) a supply path for d.c. current;
      (ii) first and second return paths for d.c. current; and
      (iii) means to selectively make said first return path operable alone, said second path operable alone, and said first and second paths operable together;
   (e) first and second impedances coupled between said timing input and said first and second return paths, respectively;
   (f) a first, one-way current valve isolating said first impedance from said ground when said first current path is rendered inoperable; and
   (g) a second, one-way current valve isolating said second impedance from said ground when said second current path is rendered inoperable.

2. The ballast of claim 1, wherein said circuit for supplying a d.c. voltage comprises:
   (a) first and second rectifiers interposed between a power supply conductor for receiving voltage of an a.c. power source and said d.c.-to-a.c. converter; and
   (b) a switch arrangement for selectively coupling said power supply conductor to each of said first rectifier, said second rectifier, and both said first and second rectifiers, one at a time.

3. The ballast of claim 1, wherein the frequency of switching of said high voltage IC is determined by the respective times of transition of a signal on said timing input, from one threshold voltage to another threshold voltage, and vice-versa.

4. The ballast of claim 1, wherein said first and second impedances comprise capacitors.

5. The ballast of claim 1, wherein said one-way current valves comprise diodes.

6. The ballast of claim 1, wherein said d.c.-to-a.c. converter comprises first and second switches serially connected between a bus conductor at a d.c. voltage and said ground, and having a common node through which said a.c. load current flows.

7. A ballast for a gas discharge lamp, comprising:
   (a) a resonant load circuit including a gas discharge lamp with a pair of resistively heated cathodes, and a resonant inductance and a resonant capacitance whose values determine the operating frequency of said resonant load circuit;
   (b) a d.c.-to-a.c. converter circuit coupled to said resonant load circuit to provide a.c. current to said resonant load circuit; said converter comprising at least one switch;
   (c) a high voltage IC for driving said at least one switch at a frequency determined at least in part by impedance between a timing input and a ground;
   (d) a circuit for supplying a d.c. voltage to said d.c.-to-a.c. converter, including:
      (i) a supply path for d.c. current;
      (ii) first and second return paths for d.c. current; and
      (iii) means to selectively make said first return path operable alone, said second path operable alone, and said first and second paths operable together;
   (e) first and second impedances coupled between said timing input and said first and second return paths, respectively;
   (f) a first, one-way current valve isolating said first impedance from said ground when said first current path is rendered inoperable;
   (g) a second, one-way current valve isolating said second impedance from said ground when said second current path is rendered inoperable; and
   (h) a cathode current-controlling frequency-dependent impedance connected between said resistively heated cathodes.

8. The ballast of claim 7, wherein said cathode current-controlling impedance consists essentially of a capacitive impedance.

9. The ballast of claim 8, wherein said capacitive impedance consists essentially of at least part of said resonant capacitance.

10. The ballast of claim 7, wherein said circuit for supplying a d.c. voltage comprises:
   (a) first and second rectifiers interposed between a power supply conductor for receiving voltage of an a.c. power source and said d.c.-to-a.c. converter; and
   (b) a switch arrangement for selectively coupling said power supply conductor to each of said first rectifier, said second rectifier, and both said first and second rectifiers, one at a time.

11. The ballast of claim 7, wherein the frequency of switching of said high voltage IC is determined by the respective times of transition of a signal on said timing input, from one threshold voltage to another threshold voltage, and vice-versa.

12. The ballast of claim 7, wherein said first and second impedances comprise capacitors.

13. The ballast of claim 7, wherein said one-way current valves comprise diodes.

14. The ballast of claim 7, wherein said d.c.-to-a.c. converter comprises first and second switches serially connected between a bus conductor at a d.c. voltage and said ground, and having a common node through which said a.c. load current flows.

* * * * *